May 7, 1946. G. W. COPP 2,399,792
CHILD'S CONVERTIBLE CHAIR
Filed Nov. 25, 1944
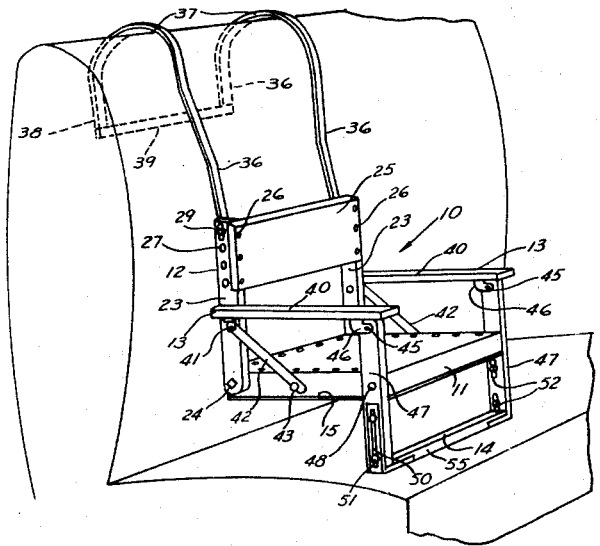
FIG. 1
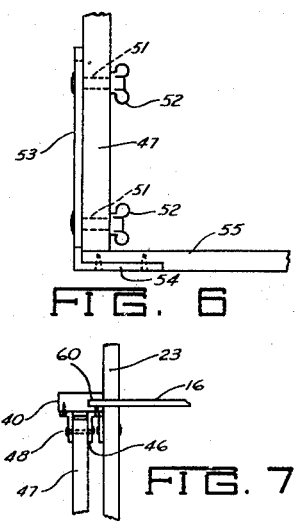
FIG. 6
FIG. 7
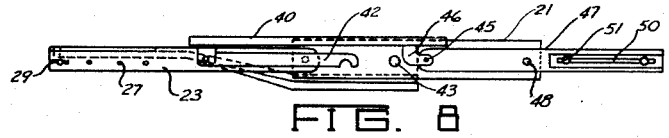
FIG. 8
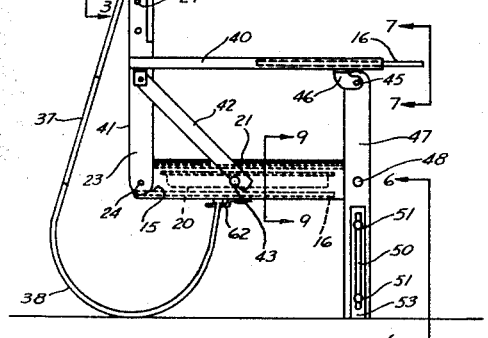
FIG. 2
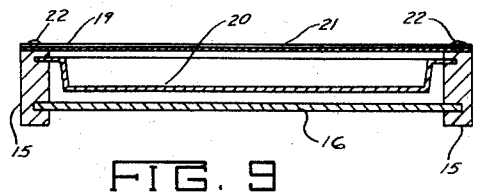
FIG. 9
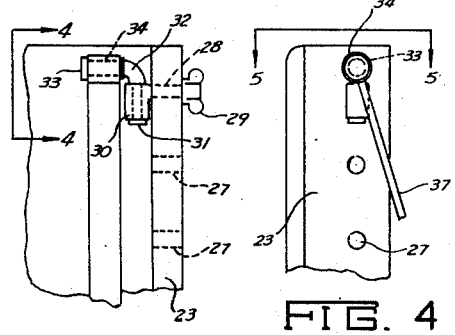
FIG. 3    FIG. 4
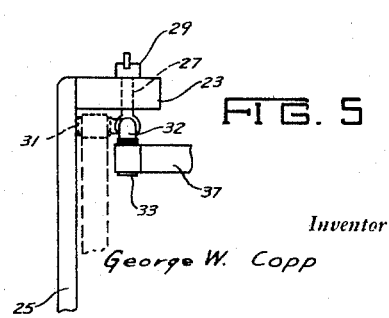
FIG. 5
Inventor
George W. Copp
By Clarence A. O'Brien
and Harvey B. Jackson
Attorneys Patented May 7, 1946

2,399,792

UNITED STATES PATENT OFFICE 2,399,792

CHILD'S CONVERTIBLE CHAIR

George W. Copp, Forest Hills, N. Y.

Application November 25, 1944, Serial No. 565,107

6 Claims. (Cl. 155—79)

This invention relates to a child's convertible chair, and more particularly to such a chair adapted to be utilized in an automobile or similar vehicle, having features whereby the same may be readily converted to a comfortable and convenient chair to be utilized exteriorly of the vehicle.

A primary object of this invention is the provision of an improved chair for infants adapted to be positioned upon a vehicle seat, and having associated therewith a member adapted to be folded, to provide a comfortable and convenient seat for the infant in a house or the like.

Still another object of this invention is the provision of such a seat which may be readily and compactly folded into a relatively small unit for storage or shipping when not in use.

A further and more specific object of the invention is the provision of such a seat adapted to be adjusted into a variety of sizes of vehicle seats.

Further objects reside in the combinations of elements, arrangements of parts, and features of construction, all as will be more fully pointed out hereinafter and disclosed in the accompanying drawing, wherein there is shown a preferred embodiment of this inventive concept.

In the drawing:

Figure 1 is a perspective view, certain portions being indicated in dotted lines, of a child's seat embodying the instant inventive concept as applied to the seat of a motor vehicle or the like.

Figure 2 is a side elevational view of the device shown in Figure 1, certain accessories and attachments being disclosed in dotted lines.

Figure 3 is a sectional view taken substantially along the line 3—3 of Figure 2 as viewed in the direction indicated by the arrows.

Figure 4 is a sectional view enlarged, taken substantially along the line 4—4 of Figure 3.

Figure 5 is a sectional view taken substantially along the line 5—5 of Figure 4, as viewed in the direction indicated by the arrows.

Figure 6 is an enlarged sectional view taken substantially along the line 6—6 of Figure 2 as viewed in the direction indicated by the arrows.

Figure 7 is an enlarged sectional view taken substantially along the line 7—7 of Figure 2 as viewed in the direction indicated by the arrows.

Figure 8 is an elevational view, certain concealed parts thereof being indicated in dotted lines, disclosing the seat of the instant invention in folded position, and Figure 9 is a sectional view taken substantially along the line 9—9 of Figure 2 as viewed in the direction indicated by the arrows.

Similar reference characters refer to similar parts throughout the several views of the drawing.

Having reference now to the drawing, there is generally indicated at 10 a child's seat, or the like, adapted to be utilized in association with a motor vehicle, preferably in such manner as to be secured to the conventional seat of the vehicle, whereby to provide a seat or support for the child in such manner that the infant may look out of the windshield or the side windows of the vehicle.

The seat 10 is broadly comprised of a seat portion 11, a back 12, arm rests 13 and a supporting or foot portion 14, all as will be more fully described hereinafter.

As best shown in Figures 2 and 9, the seat portion 11 is comprised of two side members 15 grooved to receive a removable base 16, and having supplemental upper grooves adapted to receive the flanges 19 of a pan, or the like adapted to serve as a child's toilet. The pan, indicated at 20, is adapted to be positioned interiorly with respect to the side frame members 15 and is covered by a removable covering 21 of canvas, upholstery, fabric or the like.

The covering 21 may be secured to the frame 15 in any suitable manner, as by snaps 22 or buttons or similar devices.

The back portion of the chair is comprised of two uprights 23 pivotally secured as by pivots 24 to the rearmost extremity of the seat portion 11. A canvas, fabric, or upholstery strip 25 is secured in any desired manner, as by buttons, snaps, rivets or the like 26, to the uprights 23.

Each of uprights 23 is provided with a plurality of apertures 27 in horizontal alignment, and adapted for the reception of bolts 28, provided at one extremity with wing nuts 29, and at the other extremity with transversely positioned channels 30 adapted to receive an extremity 21, as best shown in Figure 3, of an angled metal member 32, the opposite extremity of which, 33 is adapted to be fitted into a groove or channel 34 of a metallic sheet metal or strip metal member 36, thus providing a pivotal connection with a pair of strip members 36, adapted to extend upwardly from the members 23 or the back 13 of the seat, and terminating in arcuate portions 37 provided with downwardly depending extremities 38 joined as by a strip 39 adapted to hook, when the device is utilized in conjunction with a motor vehicle over the back of the vehicle seat.

Arms 40 are pivotally secured as on pivots 41 to the members 23, and are adapted to be reinforced as by transversely or diagonally extending angle irons 42 provided with notches adapted to engage pins 43 on members 15.

Pivotally secured to the outer extremities of arm members 40, as by pivot pins 45 passed through brackets 46 are leg members 47, which are, in turn, secured as by pivots 48 to members 15, the whole forming a pivotal related assembly adapted to be folded, in a manner to be more fully described hereinafter.

The legs 47 are provided with longitudinally extending slots 50 in their lower extremities, through which are passed bolts 51 secured by wing nuts 52 and engaging angle iron members 53, having inwardly extending flanged portions 54 secured to a transverse bar 55 adapted to extend between the legs 47.

From the foregoing it will be seen that by loosening the wing nuts 52 the bar 55 may be readily adjusted within the slots 50, in such manner as to vary the height of the seat 10 with respect to the vehicle seat with which it is adapted to be associated.

As best shown in Figure 7 the arm members 40 may be grooved as at 60, in order to provide means whereby the base 16 may be inserted between the arms, to be used as a tray for feeding the infant or the like.

From the foregoing the operation of the device should now be readily understandable. When the device is to be utilized in a motor vehicle or the like, the members 36 are extended to the position shown in Figure 1, and the arcuate portions 37 hooked over the back of the vehicle seat, the member 39 extending transversely therealong to hold the seat securely in its desired position. At the termination of the ride when it is desired to utilize the device as a child's seat, the members 37 are swung about their pivots 28, the wing nuts 29 being loosened, to the position shown in Figure 2, whereupon the arcuate surfaces 38 serve as rear legs or supports for the seat, in order to provide a comfortable and efficient chair for the infant, a latch 62 being provided therefor. When it is desired to utilize the seat as a toilet, obviously, the snaps 22 may be released and the canvas covering 21 removed to provide access to the pan 20.

Correspondingly, when it is desired to utilize the device for feeding the infant or the like, the tray 16 may be inserted in the grooves 60 in the manner previously described, and the device utilized as a chair for feeding or the like.

When the seat is not in use it may be readily folded to flat position as shown in Figure 8 by swinging the back about pivot 24, the arms and front legs about pivots 45 and 48, respectively, and swiveling the members 36 and 38 inwardly within the frame by means of members 30.

From the foregoing it will now be seen that there is herein provided a device accomplishing all the objects of this invention and others including many advantages of great practical utility and commercial importance.

It will also be seen that there is herein provided a device which is sturdy and durable in construction, reliable and efficient in operation, and relatively simple and inexpensive to manufacture and assemble.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a device of the character described, in combination, a seat, front legs secured to said seat, a back secured to said seat, rear legs for said seat, said rear legs comprising members terminating in hook shaped portions, the outer surface of said portions serving as feet for the legs and the tips of said portions abutting the underside of said seat to support said seat, and pivots connecting the ends of said rear legs to said back on opposite sides thereof whereby said legs can be rotated about said pivots to position said hook shaped portions in reversed relation facing outwardly with respect to said back for suspending said device.

2. In a device of the character described, in combination, a seat, front legs secured to said seat, a back secured to said seat, rear legs for said seat, said rear legs comprising members terminating in hook shaped portions, the outer surface of said portions serving as feet for the legs and the tips of said portions abutting the underside of said seat to support said seat, pivots connecting the ends of said rear legs to said back on opposite sides thereof whereby said legs can be rotated about said pivots to position said hook shaped portions in reversed relation facing outwardly with respect to said back for suspending said device, and latch means for securing said tips to the underside of said seat.

3. In a device of the character described, in combination, a seat, front legs secured to said seat, a back secured to said seat, rear legs for said seat, said rear legs comprising members terminating in hook shaped portions, the outer surface of said portions serving as feet for the legs and the tips of said portions abutting the underside of said seat to support said seat, pivots connecting the ends of said rear legs to said back on opposite sides thereof whereby said legs can be rotated about said pivots to position said hook shaped portions in reversed relation facing outwardly with respect to said back for suspending said device, and means for varying the effective length of said front legs.

4. In a device of the character described, in combination, a seat, front legs secured to said seat, a back secured to said seat, rear legs for said seat, said rear legs comprising members terminating in hook shaped portions, the outer surface of said portions serving as feet for the legs and the tips of said portions abutting the underside of said seat to support said seat, pivots connecting the ends of said rear legs to said back on opposite sides thereof whereby said legs can be rotated about said pivots to position said hook shaped portions in reversed relation facing outwardly with respect to said back for suspending said device, and means for varying the position of the pivotal connection between said rear legs and said back to vary the effective length of said rear legs.

5. In a device of the character described, in combination, a seat, front legs secured to said seat, a back secured to said seat, rear legs for said seat, said rear legs comprising members terminating in hook shaped portions, the outer surface of said portions serving as feet for the legs and the tips of said portions abutting the underside of said seat to support said seat, pivots connecting the ends of said rear legs to said back on opposite sides thereof whereby said legs can be rotated about said pivots to position said hook shaped portions in reversed relation facing outwardly with respect to said back for suspending said device, means for varying the position of the pivotal connection between said rear legs and said back to vary the effective length of said rear legs, and means for varying the effective length of said front legs.

6. In a device of the character described, in combination, a seat, front legs pivotally secured to said seat, a back pivotally secured to said seat, rear legs for said seat, said rear legs comprising members terminating in hook shaped portions, the outer surface of said portions serving as feet for said rear legs and the tips of said portions abutting the underside of said seat to support said seat, pivots connecting the ends of the rear legs to said back on opposite sides thereof whereby said legs can be rotated about said pivots to position said hook shaped portions in reversed relation facing outwardly from said back to suspending said device, latch means securing said arms, legs, and back to preclude pivotal movement thereof with respect to said seat, said pivotal connection being so arranged that upon release of said latch means, said arms, legs and back can be folded about said pivots to form a relatively flat, compact unit.

GEORGE W. COPP.